F. P. SHEK.

RACK.

APPLICATION FILED OCT. 26, 1909.

Reissued Apr. 2, 1912. 13,395.

2 SHEETS—SHEET 1.

Witnesses:
Harvey C. Graeppel
Henry Holling

Inventor
Frank P. Shek,
By his Attorney
R. G. Morrisby.

COLUMBIA PLANOGRAPH CO., WASHINGTON, D. C.

F. P. SHEK.

RACK.

APPLICATION FILED OCT. 26, 1909.

Reissued Apr. 2, 1912.

13,395.

2 SHEETS—SHEET 2.

Witnesses:
Harold C. Knoeppel
Henry Holding

Inventor
Frank P. Shek,
By his Attorney
R. P. Merrill

COLUMBIA PLANOGRAPH CO., WASHINGTON, D. C.

UNITED STATES PATENT OFFICE.

FRANK P. SHEK, OF BROOKLYN, NEW YORK.

RACK.

13,395. Specification of Reissued Letters Patent. Reissued Apr. 2, 1912.

Original No. 924,386, dated June 8, 1909, Serial No. 477,530. Application for reissue filed October 26, 1909. Serial No. 524,754.

*To all whom it may concern:*

Be it known that I, FRANK P. SHEK, a citizen of the United States of America, residing at Brooklyn, in the county of Kings and State of New York, have invented certain new and useful Improvements in Racks, of which the following is a specification, such as will enable those skilled in the art to which it appertains to make use of the same.

This invention relates to racks and more particularly to what are known as "pan-racks", commonly used by bakers and confectioners and others, to cool, display or conveniently store their wares; and the object thereof is to provide an improved device of this class which may be conveniently folded together and packed in a small space when not in use, and which may be easily set up or placed in position for use whenever so desired.

Figure 2:
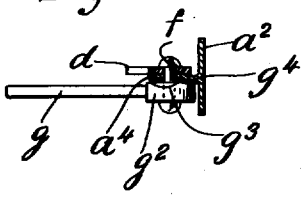
Figure 3:
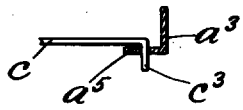
Figure 1:
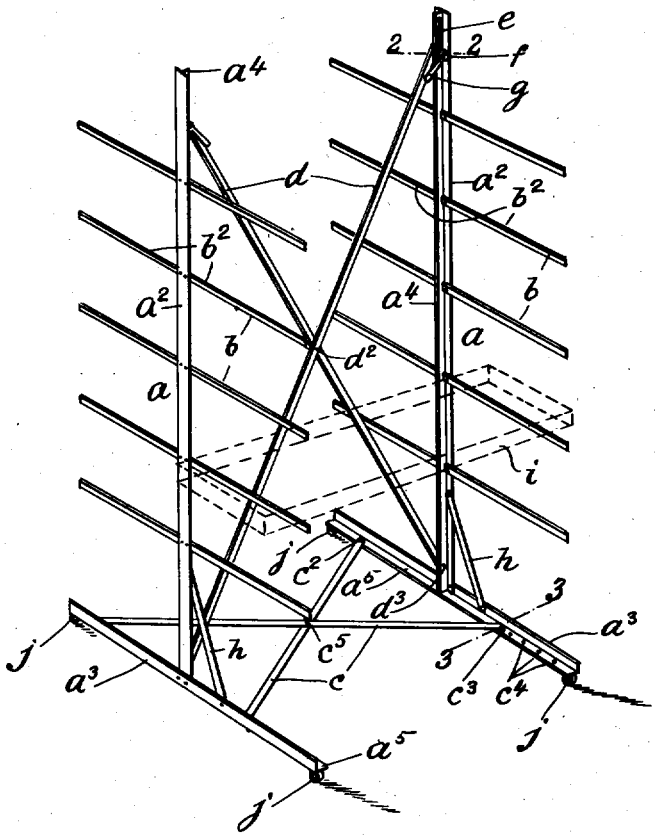
Figure 4:
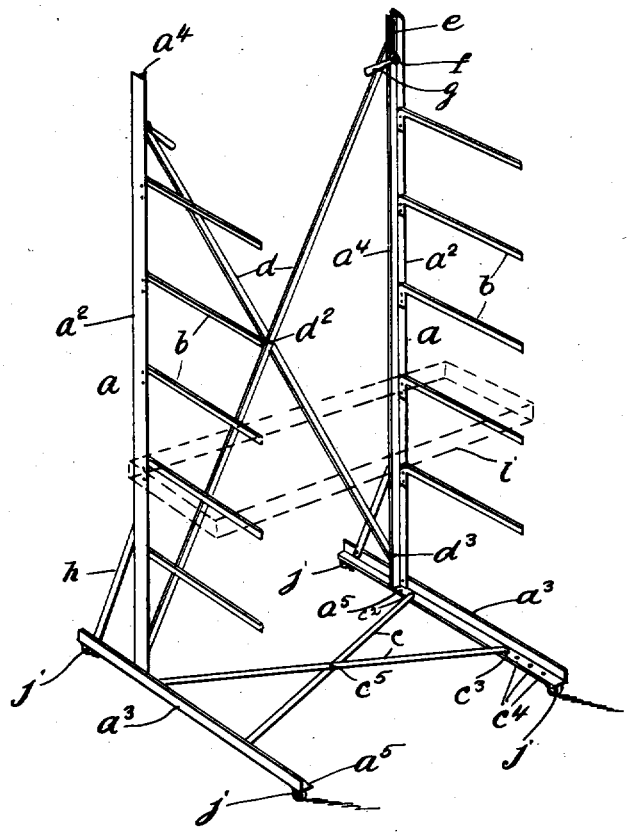

Figure 1. is a perspective view of a rack embodying my invention. Fig. 2. is a sectional view, on the line 2—2 of Fig. 1. Fig. 3. is a sectional view, on the line 3—3 of Fig. 1. Fig. 4. shows one modification of the device.

The form of my device shown, is composed of two main side portions or parts $a$, each of which comprises an upright member $a^2$, and a horizontal or base member $a^3$, the upright member $a^2$, being provided with horizontal arms $b$, the base members $a^3$, being connected, preferably, by diagonally or obliquely arranged cross bars or rods $c$, and the upright members $a^2$, being connected, preferably, by obliquely or diagonally arranged cross bars or rods $d$, which are pivotally connected at $d^2$.

The upright members $a^2$, in the form of construction shown, are composed of T-rails, and the horizontal arms $b$, are passed through the web portions of said rails and riveted or otherwise secured to said rails, the web members $a^4$, being directed inwardly.

The base members $a^3$, of the side portions $a$, are composed of angle iron L-shaped in cross section, and the bottom rods or bars $c$, are pivoted at one end to the horizontal web portions $a^5$, of said members, as shown at $c^2$, and the other ends of said rods or bars are provided with hooks $c^3$, which are adapted to be passed through holes $c^4$, in the horizontal web portions $a^5$, of the base members $a^3$, and said rods or bars $c$, are pivotally connected at $c^5$.

The lower end portions of the cross bars or rods $d$, are pivoted at $d^3$, to the bottoms of the upright members $a^2$, or the inwardly directed webs $a^4$, thereof, and said webs are provided at the tops of the upright members $a^2$, with longitudinal slots $e$, and the upper ends of the rods or bars $d$, are provided with bolts or pins $f$, which pass through said slots and are provided with crank handles $g$, having heads $g^2$, provided in one side with a cam recess $g^3$, and the web members $a^4$, are provided on the side thereof adjacent to the crank handles $g$, with cam lugs or projections $g^4$. The upright members $a^2$, of the side portions of the device are also preferably connected with the base members $a^3$, by braces $h$, and as thus constructed it will be seen that the separate parts of the device may be held as shown in Fig. 1, in which position a pan or other receptacle, may be supported by the horizontal arms $b$ on both sides of the upright members $a^2$, and in this way a large number of such pans or receptacles may be supported on my improved rack, and said pans or receptacles may be used for holding or containing any kind or class of articles, and especially bakery products for cooling, drying or other purposes.

When the device is not in use, the side portions $a^2$, may be compactly folded together and the whole stored in a small space, and in order to do this all that is necessary is to disconnect the hooks $c^3$, of the bottom rods or bars $c$, from the base or bottom members $a^3$, and turn the crank handles $g$, upwardly. This operation will enable the bolts or pins $f$, to slide freely in the slots $e$, and the separate side members $a^2$, of the device may be folded together as will be readily understood.

When the separate parts of the device are expanded for use as shown in Fig. 1, the crank handles $g$, should be turned downwardly into the position shown in Fig. 1, and in this operation the rods or bars $d$, are locked to the upright members $a^2$, in the position shown in said figure.

In the construction shown in Fig. 4, the upright members $a^2$, of the side portions, are provided with arms $b$, at one side only and the bottom rods or bars $c$, are connected with only one end or side part of the base members $a^3$, and with these exceptions, the two forms of construction shown are substantially the same and may be operated in the same manner.

The base members or parts $a^3$, in both forms of construction are preferably provided with casters or rollers $j$, whereby the device may be conveniently moved from one place to another if desired, and by means of my invention I provide a device of the class specified which is simple in construction and operation, and comparatively inexpensive and which may be conveniently used for the purpose specified, wherever desired, and also for other purposes.

It will be readily understood that in describing one or two forms of the device, I do not limit myself to the exact forms shown. Broadly considered, my invention consists in a rack composed of two side portions, each including an upright, a base and horizontal arms, extending from the uprights, together with connections from one side to the other, so arranged and so connected to the side portions that they may be locked in a given position and upon being unlocked, they will permit one side portion to be brought closely against the other side portion, and will also permit one side portion to be set a given distance, (within the limits of the connections), from the other side portion and there secured, and though I prefer to use two sets of crossed diagonal bars, as shown, for that purpose, the invention is not limited to a device so constructed. Other connections for accomplishing the desired result can be readily constructed and substituted for those shown.

What I do claim as my invention and desire to secure by Letters-Patent, is:—

1. A rack of the class described comprising upright members connected with horizontal base members, the upright members being provided with laterally directed arms, and the upright members being connected by diagonally arranged rods or bars which are pivoted to the bottoms of said upright members and movable longitudinally of the top portions of said upright members and adapted to be locked thereto, said rods or bars being pivotally connected centrally thereof, and the base members of the device being also connected by diagonally or obliquely arranged rods or bars, said rods or bars being pivotally connected centrally thereof, one end portion thereof being pivoted to said base members and the other end portions of said rods or bars being adapted to be connected with said base members at different points.

2. A rack of the class described comprising side portions composed of upright members and horizontal base members, the upright members being provided with laterally directed arms, and said upright members being connected at the top and bottom by diagonally or obliquely arranged rods or bars, said rods or bars being pivotally connected with the lower ends of the upright members and being movable longitudinally of the top portions thereof and adapted to be locked thereto, the base members being also connected by diagonally or obliquely arranged rods or bars, one end portion of said rods or bars being pivoted to the base members, and the other end portions thereof being adapted to be detachably connected therewith.

3. A rack of the class described comprising side portions composed of upright members and horizontal base members, the upright members being provided with laterally directed arms and the top and bottom portions of said upright members being connected by diagonally or obliquely arranged rods or bars which cross each other and are pivotally connected where crossed, the connection of said rods or bars with said upright members at one end being a pivotal connection, and at the other a longitudinally movable connection, the base members being also connected by diagonally or obliquely arranged rods or bars which cross each other and are pivotally connected where crossed, one end portion of said rods or bars being pivoted to the said base members, and the other end portion thereof being detachably connected with said base members.

4. A rack of the class described, comprising side portions, each composed of a base, an upright member rigidly secured thereto and provided with laterally directed arms projecting from the upright members, diagonal brace members pivotally connected to the lower parts of the upright members and slidably connected at the upper ends to the upright members and means to lock the diagonal members to the upright members comprising a pin passing through the members and a cam lever on the pin, which cam lever by its movement draws the diagonal and the upright members together all substantially as set forth.

In witness whereof I have here subscribed my name in the presence of two witnesses at Manhattan, in the city, county and State of New York, this 15th day of October, 1909.

FRANK P. SHEK.

Witnesses:

A. G. N. VERMILYA,

CHARLOTTE BORRS.

Copies of this patent may be obtained for five cents each, by addressing the "Commissioner of Patents. Washington, D. C."